US 10,393,018 B2

(12) United States Patent
Wu et al.

(10) Patent No.: US 10,393,018 B2
(45) Date of Patent: Aug. 27, 2019

(54) POWER PLANT METHODS AND APPARATUS

(71) Applicant: Mitsubishi Hitachi Power Systems Americas, Inc., Basking Ridge, NJ (US)

(72) Inventors: Song Wu, Livingston, NJ (US); Allan Kukoski, Milford, NJ (US); Yasushi Fukuizumi, Kobe (JP)

(73) Assignee: Mitsubishi Hitachi Power Systems Americas, Inc., Basking Ridge, NJ (US)

( * ) Notice: Subject to any disclaimer, the term of this patent is extended or adjusted under 35 U.S.C. 154(b) by 416 days.

(21) Appl. No.: 15/172,024

(22) Filed: Jun. 2, 2016

(65) Prior Publication Data

US 2017/0350319 A1    Dec. 7, 2017

(51) Int. Cl.
*F01K 7/16* (2006.01)
*F02C 3/04* (2006.01)
(Continued)

(52) U.S. Cl.
CPC ............ *F02C 6/18* (2013.01); *B01D 53/9418* (2013.01); *F01D 15/10* (2013.01); *F01D 19/02* (2013.01);
(Continued)

(58) Field of Classification Search
CPC ...... F02C 6/18; F02C 9/50; F02C 3/04; F22B 35/007; F22B 35/001; F22B 1/1861;
(Continued)

(56) References Cited

U.S. PATENT DOCUMENTS

| 4,136,643 A | * | 1/1979 | Aguet | ................... F22B 1/1861 |
| | | | | 122/240.1 |
| 2005/0241289 A1 | * | 11/2005 | Briesch | ................. F01K 23/106 |
| | | | | 60/39.182 |
| 2010/0101462 A1 | * | 4/2010 | Hayashi | .................. F01K 13/02 |
| | | | | 110/190 |

FOREIGN PATENT DOCUMENTS

| DE | 4304124 C1 | 3/1994 |
| DE | 10225126 A1 | 1/2003 |

(Continued)

OTHER PUBLICATIONS

Notification of Transmittal of the International Search Report and the Written Opinion of the International Searching Authority, or the Declaration containing the International Search Report and Written Opinion From PCT/US2017/034822, dated Aug. 31, 2017, pp. 1-15.

*Primary Examiner* — J. Todd Newton
(74) *Attorney, Agent, or Firm* — Straub & Straub; Michael P. Straub; Stephen T. Straub (57) ABSTRACT

A hybrid power plant system including a gas turbine system and a coal fired boiler system inputs high oxygen content gas turbine flue gas into the coal fired boiler system, said gas turbine flue gas also including carbon dioxide that is desired to be captured rather than released to the atmosphere. Oxygen in the gas turbine flue gas is consumed in the coal fired boiler, resulting in relatively low oxygen content boiler flue gas stream to be processed. Carbon dioxide, originally included in the gas turbine flue gas, is subsequently captured by the post combustion capture apparatus of the coal fired boiler system, along with carbon diode generated by the burning of coal. The supply of gas turbine flue gas which is input into the boiler system is controlled using dampers and/or fans by a controller based on an oxygen sensor measurement and one or more flow rate measurements.

6 Claims, 4 Drawing Sheets

(51) Int. Cl.

| | |
|---|---|
| *F02C 6/18* | (2006.01) |
| *B01D 53/94* | (2006.01) |
| *F01D 15/10* | (2006.01) |
| *F01K 23/10* | (2006.01) |
| *F02C 9/50* | (2006.01) |
| *H02K 7/18* | (2006.01) |
| *F01D 19/02* | (2006.01) |
| *F23J 15/00* | (2006.01) |
| *F22B 1/18* | (2006.01) |
| *F23L 15/04* | (2006.01) |
| *F22B 35/00* | (2006.01) |
| *F23N 5/00* | (2006.01) |

(52) U.S. Cl.
CPC .............. *F01K 7/165* (2013.01); *F01K 23/10* (2013.01); *F01K 23/101* (2013.01); *F02C 3/04* (2013.01); *F02C 9/50* (2013.01); *F22B 1/1815* (2013.01); *F22B 1/1861* (2013.01); *F22B 35/001* (2013.01); *F22B 35/007* (2013.01); *F23J 15/006* (2013.01); *F23L 15/04* (2013.01); *F23N 5/006* (2013.01); *H02K 7/1823* (2013.01); *F05D 2210/12* (2013.01); *F05D 2220/31* (2013.01); *F05D 2220/32* (2013.01); *F05D 2260/60* (2013.01); *F05D 2270/08* (2013.01); *F23K 2201/1006* (2013.01); *F23L 2900/07002* (2013.01); *Y02E 20/16* (2013.01); *Y02E 20/328* (2013.01); *Y02E 20/348* (2013.01)

(58) Field of Classification Search
CPC .................... F22B 1/1815; F23L 15/04; F23L 2900/07002; F23L 2900/07; F23J 15/006; F23N 5/006; F01D 19/02; F01D 15/10; F01K 7/165; F01K 23/101; F01K 23/10; H02K 7/1823; B01D 53/9418; F05D 2270/08; F05D 2260/60; F05D 2210/12; F05D 2220/31; F05D 2220/32; Y02E 20/348; Y02E 20/16; F23K 2201/1006
USPC .......................................................... 60/783
See application file for complete search history.

(56) References Cited

FOREIGN PATENT DOCUMENTS

| | | |
|---|---|---|
| GB | 904536 | 8/1962 |
| JP | 2005351239 | 12/2005 |

* cited by examiner

POWER PLANT METHODS AND APPARATUS

FIELD

The present application relates to power plant methods and apparatus, more particularly, to methods and apparatus for reducing CO2 intensity.

BACKGROUND

Power plants burning fossil fuels are large emitters of carbon dioxide. Coal and natural gas are the most widely used fossil fuels for power generation worldwide and in the US. When burned, coal of various types releases more CO2 per unit electricity generated than other fossil fuels including natural gas. As a result, coal-fired power plants have the highest CO2 intensity (CO2 emissions per unit of electricity output) of all thermal power plants.

On the other hand, natural gas-fired, combustion turbine based power plants have lower CO2 intensity than coal-fired plants. However, gas turbine (GT) exhaust typically has low CO2 concentration (4-5% vol) and high oxygen concentration (13-14% vol), compared to 12-13% CO2 and 5-6% oxygen for typical coal-fired power plants. The low CO2 concentration of GT exhaust can lead to large equipment size and capital investment, and high oxygen concentration can result in accelerated degradation of the CO2 solvent and increased operating cost, for a post-combustion CO2 capture (PCC) system for a gas-fired combustion turbine based power plant.

Based on the above discussion, there is a need for new methods and apparatus for reducing CO2 intensity with regard to exhaust gases generated in a gas fired combustion turbine.

SUMMARY

Various embodiments, in accordance with the present invention, include the integration of GT exhaust with a coal-fired boiler, and by doing so utilize the remaining oxygen in the GT exhaust. Various exemplary embodiments are directed to an integrated GT-Boiler system. The exhaust gas from the integrated GT-Boiler system will have similar O2 and CO2 concentrations as those from typical coal-fired power plants, which can be more cost effectively captured with available CO2 absorption technology.

The integration of the GT and boiler, in accordance with the present invention, also effectively utilizes the waste heat of the GT exhaust. Therefore an exemplary novel integrated system, in accordance with the present invention, has higher plant efficiency than the combined efficiency of a standalone coal-fired power plant and a standalone natural gas-fired GT power plant.

An exemplary proposed integrated system, in accordance with the present invention, reduces the CO2 intensity of the power plant by the above mentioned thermal efficiency improvement and also by utilizing natural gas which emits less CO2 per unit heating value than coal.

In a first configuration, in accordance with the present invention, the GT exhaust first goes through a heat recovery steam generator (HRSG). This exhaust after the HRSG of a gas turbine combined cycle plant (GTCC) is relatively cool (typically around 200 F) and can be, and is, in various embodiment is, introduced into a plurality of areas of a coal-fired power plant. For example in one exemplary embodiment in accordance with the first configuration, five streams of relatively cool HRSG output exhaust are introduced into five different locations in a coal fired power plant. This first configuration utilizes the oxygen and low grade waste heat in the GTCC exhaust gas. The resulted flue gas from the boiler power plant can be, and is, effectively treated in a CO2 absorption process for CO2 capture.

In a second configuration, in accordance with the present invention, hot exhaust gas directly from a simple cycle gas turbine (GT), without going through a HRSG, is injected into the boiler plant, e.g., a coal-fired boiler plant. This exhaust gas from the GT, with temperature typically in the 900-1150 F range, is injected in streams, e.g., four streams, into the boiler plant, with the injection points being at selected locations where such high temperature and partially oxygen-depleted gas can be effectively utilized in the boiler. Essentially, this second configuration utilizes the existing boiler as the heat recovery unit instead of a having a new, separately installed HRSG as the heat recovery unit. This second configuration utilizes the oxygen and the high temperature waste heat in the simple cycle GT exhaust gas, without the need of a separate HRSG. The resulting flue gas from the boiler power plant can be effectively treated in a CO2 absorption process for CO2 capture.

In various embodiments, oxygen rich exhaust gas from a gas turbine is injected into a coal fired boiler system, said exhaust gas from the gas turbine including carbon dioxide that is desired to be captured. Oxygen in the gas turbine exhaust gas is consumed in the coal-fired boiler, and the CO2, originally from the gas turbine exhaust, is output into the flue gas from the boiler. The CO2, originally from the gas turbine exhaust, is captured within a PCC system, along with CO2 generated from the burning of coal. It should be appreciated that the flue gas being processed by the PCC has a lower oxygen content than the flue gas output from the gas turbine, facilitating a more efficient and less expensive capture of the gas turbine generated CO2.

In some embodiments, heat energy within the gas turbine exhaust gas is captured using a post gas turbine HRSG. In some embodiments, heat energy within the gas turbine exhaust gas is used to heat inlet gas flows pertaining to the coal fired system. Thus the integrated natural gas turbine-coal fired boiler power plant system utilizes this energy to generate power, which might have been otherwise lost and wasted.

Various features, methods, apparatus and/or embodiments, in accordance with the present invention, can be applied to any power plants where there is (are) existing gas turbine unit(s) in the vicinity of coal-fired units, or power plants where there is space for building new GT or GTCC unit(s) that are integrated with the coal-fired units. The proposed integration of GT and boiler is an effective way to reduce carbon intensity and extending the service life of existing coal power plants, which, with a total installed capacity of over 300 GW, generates more power than any other types of power plants in the U.S.

An exemplary power system in accordance with some embodiments includes: a boiler system including: a boiler; an oxygen sensor; one or more gas turbine flue gas inputs including at least one of: i) a gas turbine flue gas boiler hopper input of said boiler or ii) a gas turbine flue gas mill air supply duct input which is included as part of a mill air supply duct which supplies air to a mill which provides fuel to said boiler; a gas turbine system; and a controller for controlling the supply of gas turbine flue gas to said one or more gas turbine flue gas inputs of said boiler system based on an oxygen level measured by said oxygen sensor.

An exemplary method of operating a system including a boiler system and a gas turbine system, the boiler system including a boiler, the turbine system including a gas turbine, in accordance with some embodiments, comprises: measuring an oxygen level in flue gas output by the boiler; operating a controller, during a first mode of operation during which said boiler is active and said gas turbine is active, to control the supply of gas turbine flue gas to a first gas turbine flue gas input of said boiler system based on the measured oxygen level, said first flue gas input being one of: i) a gas turbine flue gas boiler hopper input of a boiler, ii) a gas turbine flue gas burner air supply duct input which supplies air to a burner of said boiler, or iii) a gas turbine flue gas mill air supply duct input which is included as part of a mill air supply duct which supplies air to a mill which provides fuel to said boiler.

Numerous additional features, embodiments and benefits of the various embodiments are discussed in the detailed description which follows. While various embodiments have been discussed in the summary above, it should be appreciated that not necessarily all embodiments include the same features and some of the features described above are not necessary but can be desirable in some embodiments.

BRIEF DESCRIPTION OF THE FIGURES

FIG. 3 comprises the combination of FIG. 3A and FIG. 3B.

DETAILED DESCRIPTION

Figure 1:
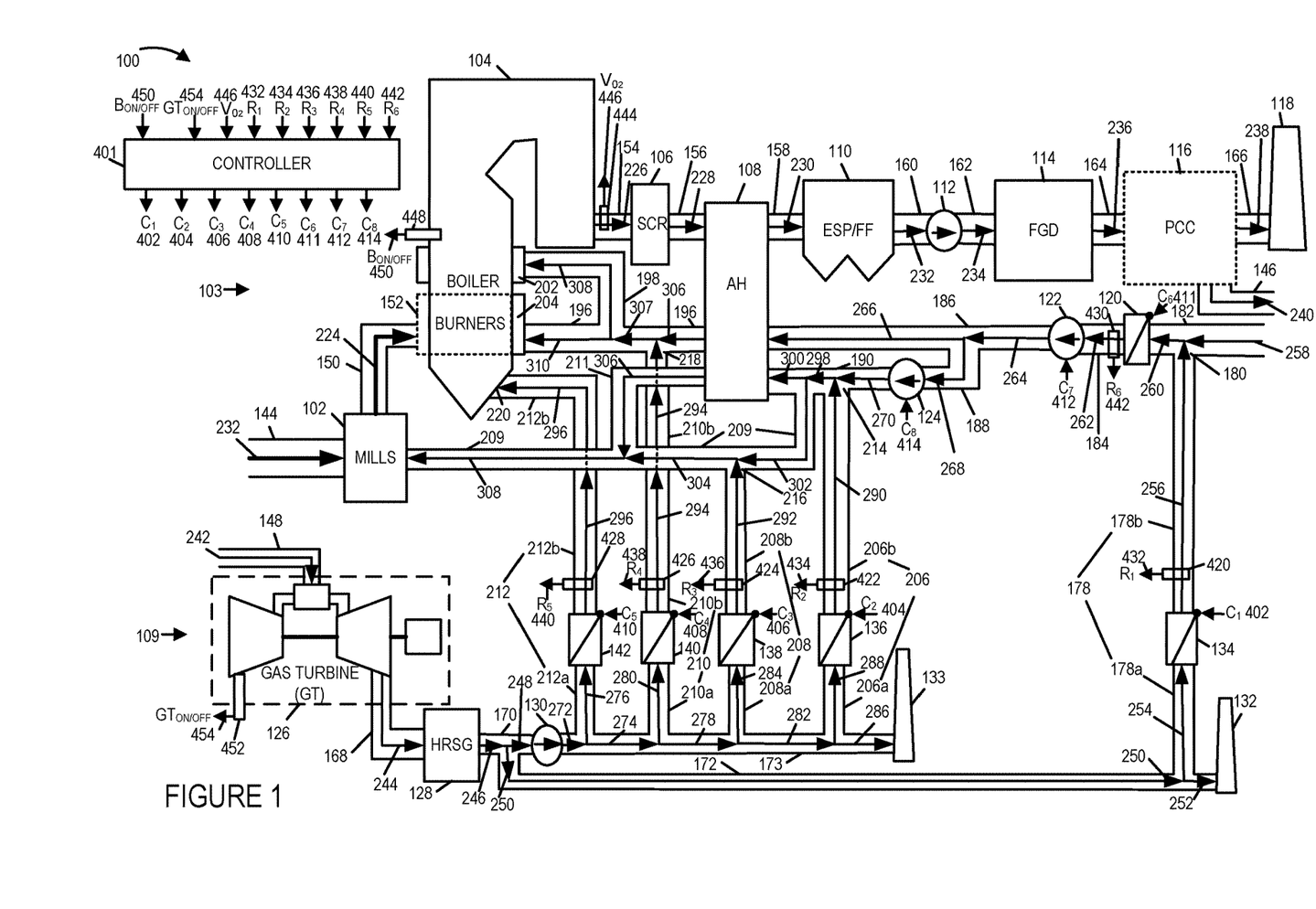
FIG. 1 is a drawing of an exemplary integrated gas turbine-coal fired boiler system, in which cold gas turbine exhaust output from a heat recovery steam generator is injected into boiler related flows in accordance with an exemplary embodiment.

FIG. 1 is a drawing of an exemplary integrated gas turbine-boiler power plant system 100 in accordance with an exemplary embodiment. Exemplary power plant system 100 includes a boiler system 103 including a boiler 104 and a gas turbine system 109 including a gas turbine 126. Exemplary system 100 includes mills 102, a boiler 104, a selective catalytic reduction (SCR) apparatus 106, an air heater (AH) 108, an electrostatic precipitator/fabric filter (ESP/FF) 110, an induced draft (ID) fan 112, a flue-gas desulfurization (FGD) apparatus 114, a post-combustion capture (PCC) apparatus 116, a first stack 118, a first damper 120, a forced draft (FD) fan 122, a primary air (PA) fan 124, a gas turbine (GT) 126, a HRSG 128, a booster fan 130, a second damper 134, a third damper 136, a fourth damper 138, a fifth damper 140, a sixth damper 142, a second stack 132, a third stack 133, a coal chute 144, a CO2 outlet pipe 146, a natural gas inlet pipe 148, a milled coal feed 150, and a plurality of ducts or pipes (154, 156, 158, 160, 162, 164, 166, 168, 170, 172, 173, 178 including first portion 178a and second portion 178b, 182, 184, 186, 188, 190, 196, 198, 206 including first portion 206a and second portion 206b, 208 including first portion 208a and second portion 208b, 209, 210 including first portion 210a and second portion 210b, 211, 212 including first portion 212a and second portion 212b) coupled together as shown in FIG. 1.

Exemplary integrated gas turbine-boiler power plant system 100 further includes a controller 401 for controlling operation of system 100, an oxygen sensor 444 for measuring oxygen level in a flue gas output by the boiler, a plurality of airflow measurement devices (420, 422, 424, 426, 428, 430), e.g., a plurality of airflow meters, each airflow meter including airflow sensor, or a plurality of airflow sensors for measuring flow rates at selected locations in the system, a boiler on/off sensor 448 configured to indicate boiler operational status, and a gas turbine on/off sensor 452 configured to indicated gas turbine operational status. Controller 401 determines a current mode of operation, processes outputs from various sensors, e.g., activation status sensors (448, 452), flow rate sensors (420, 422, 424, 426, 428, 430), an oxygen measurement sensor 444, determines control, e.g., desired GT flue gas input(s) into the boiler system in terms of which input(s) are to be used at a given time and/or GT flue gas injection amounts for the selected inputs, the desired control position of dampers (134, 136, 138, 140, 142) at a given time to achieve the desired control effects, and the desired throughput of fans (412, 414), and generates sends control signal to implement the desired control. In various embodiments, GT flue gas input into the boiler system is determined as a function of a measured oxygen level, e.g., in the flue gas 226 output by the boiler 104.

Controller 401 receives a boiler active status signal via line 450. Controller 701 receives a gas turbine active status signal via line 454. Controller 701 receives an oxygen sensor measurement signal via line 446. Controller 701 receives airflow rate measurement signals via lines (432, 434, 436, 438, 440, 442). Controller 701 sends controls signals via lines (402, 404, 406, 408, 410 412, 414, 414) to control the position of the dampers and fans.

Coal 232 is fed to mills 102 via coal chute 144. Mills 102 receives the coal 232 and mills the coal 232 generating milled coal 224, e.g., pulverized coal, which is fed, via milled coal feed 150, to the burners 152 of boiler 104. Burner air input stream 310 is received via burner air input 204; over fire air stream 308 is received via over fire air input 202. The burners 152 of boiler 104 burn the received milled coal 224 generating steam, e.g., superheated steam, used to drive a steam turbine which spins a generator and generates electrical power, and the boiler outputs flue gas. Exhaust gas stream 226, the flue gas output, is output from boiler 104 and directed to SCR 106, via duct 154. The SCR 106 processes the received exhaust gas stream 154, said processing including reducing nitrous oxides (NOx), e.g., into $N_2$ and water, and generates SCR output gas stream 228, which is fed to an inlet of AH 108, via duct 156. The AH 108 removes heat from the gas stream 228, at least some of the removed heat is transferred into gas streams being directed into the boiler 108 and the mills 208.

The outlet gas stream 230 from AH 108 is directed to an inlet of ESP/FF 110 via duct 158. The ESP/FF 110 reduces ash from the flue gas flow being processed, and fly ash and other waste products are recovered. The outlet gas stream 232 from ESP/FF 110 is directed to the inlet of ID fan 112 via duct 160. The outlet gas stream 234 from ID fan 112 is directed to an inlet of FGD 114. The FGD 114 removes sulfur dioxide (SO2) from the flue gas flow being processed. Outlet gas stream 236 from FGD 114 is directed to the inlet of PCC 116 via duct 164. The PCC 116 captures CO2 from the flue gas flow being processed. An outlet gas stream 238 from PCC 116 is directed to the inlet of stack 188 via duct 166. PCC 116 also outlets captured CO2 240 via CO2 outlet pipe 146. The captured CO2 can be compressed and stored, e.g., underground, and/or may be utilized for other purposes that do not result in release to the atmosphere. It should be appreciated that some of the captured CO2 includes CO2 which was included in the cold GT exhaust injected gas flows (256, 290, 292, 294, 296).

Gas turbine 126 receives natural gas 242 via gas inlet pipe 148. The gas turbine burns the received natural gas 242 and outputs hot GT exhaust 244 via duct 168. Duct 168 directs the hot GT exhaust 244 to an input of HRSG 128. HRSG 128 extracts heat from the received hot GT exhaust 244 and outputs cold GT exhaust 246 into duct 170. Duct 170 is coupled to the input of booster fan 130. Duct 172 is coupled to duct 170. A first portion 248 of cold GT exhaust 246 is input to booster fan 130; and a second portion 250 of cold GT exhaust 246 is directed down duct 172.

Duct 172 is coupled to an input of stack 132 and an inlet of duct 178. A first portion 252 of cold GT exhaust 250 is input to stack 132; a second portion 254 of cold GT exhaust 250 is input to duct 178.

Cold GT exhaust stream 248 is input to booster fan 130 and output as cold GT exhaust stream 272 into duct 173. Duct 173 is coupled to the input of stack 133 and to the inputs of ducts 206, 208, 210 and 212. The outputs of duct portions (206a, 208a, 210a, 212a), are coupled to the inputs of dampers (136, 138, 140, 142), respectively. The outputs of dampers (136, 138, 140, 142) are coupled to the inputs of duct portions (206b, 208b, 210b, 212b), respectively. Gas flow 272 is divided into gas flow 274 which proceeds down duct 173 and gas flow 276 which enters duct 212. Gas flow 274 is divided into gas flow 278 which proceeds down duct 173 and gas flow 280 which enters duct 210. Gas flow 278 is divided into gas flow 282 which proceeds down duct 173 and gas flow 284 which enters duct 208. Gas flow 282 is divided into gas flow 286 which proceeds down duct 173 and enters stack 133 and gas flow 288 which enters duct 206.

Second cold GT exhaust gas injection stream 290 is output from damper 136 into duct portion 206b and is injected into the gas stream 270 emerging from the PA fan 124 at input 214 of duct 190.

Third cold GT exhaust gas injection stream 292 is output from damper 138 into duct portion 208b and is injected into the gas stream 302 flowing toward the mills 102, the injection being at input 216 of duct 209.

Fourth cold GT exhaust gas injection stream 294 is output from damper 140 into duct portion 210b and is injected into the gas stream 306 forming gas stream 307 which will supply burner air as stream 310 and OFA air as stream 308, the injection being at input 218 of duct 196.

Fifth cold GT exhaust gas injection steam 296 is output from damper 142 into duct portion 212b and directed into the bottom of the furnace of boiler 104 through water walls below the burners 152 via input 220.

The output of duct portion 178a is coupled to an input to damper 134, and the output of damper 134 is coupled to first cold GT air injection stream duct portion 178b. First cold GT air injection stream duct portion 178b is coupled to inlet 180 of air duct 182. Fresh air 258 received via duct 182 is mixed in duct 182 with cold GT exhaust stream 256 received via duct 178 to generate gas stream 260. The outlet of duct 182 is coupled to an inlet of damper 120, and the outlet of damper 120 is coupled to an inlet to FD fan 122. The outlet of FD fan 122 is coupled to an inlet of duct 186, and the outlet of duct 186 is coupled to an inlet of AH 108. Duct 188 is also coupled duct 186. Gas stream 262 is input to FD fan 122 and output as gas stream 264. A first portion 266 of gas stream 264 is directed to an AH 108 inlet via duct 186; a second portion 268 of gas stream 264 is directed to an input of PA fan 124 via duct 188. Output gas stream 306, which corresponds to input gas stream 266, emerges from air heater 108 and is directed via duct 196 toward burner air input 204 of boiler 104.

Duct 196 is coupled to an outlet of duct 210 and an inlet of duct 198. Within duct 196 AH output gas stream 306 is mixed with received fourth cooled GT exhaust stream 294, received via duct 210, to generate gas stream 307. A first portion 310 of gas stream 307 is directed to burner input 204 as the burner air stream, via burner air input duct 196; a second portion 308 of gas stream 307 is directed to OFA input 202 via duct 198.

Inlet gas flow with regard to the mills 102 will now be described. PA fan 124 receives gas flow 268, via duct 188, and outputs flow 270 into duct 190. Duct 190 is coupled to duct 214 and duct 206. Gas stream 270 is combined in duct 190, with second cold GT exhaust stream 290, received via duct 206, to generate gas stream 298. A first portion 300 of gas stream 298 is input to AH 108 via duct 190; and a second portion 302 of gas stream 298 is directed into mills inlet duct 209. The outlet of mills inlet duct 209 is coupled to the mills air inlet of mills 102. Third cold GT exhaust stream injection duct 208 is coupled to duct 209. Gas stream 302 is combined in duct 209 with third cold GT exhaust injection stream 292, which is received via duct 208 to generate gas stream 304. Duct 209 is further coupled to duct 211. Output gas stream 306, which corresponds to inlet gas stream 300, emerges from AH 108, and is directed via duct 211 to duct 209. In duct 209, gas stream 304 is combined with gas stream 306 to generate mills burner inlet air stream 308.

Fifth cold GT exhaust stream 296 is directed via duct 212 directly into inlet 220 in the bottom of the furnace of boiler 104 through water walls below the burners 152.

In some embodiments, gas turbine 126 and HRSG 128 are part of a GTCC plant and mills 102, boiler 104, SCR 106, AH 108, ESP/FF 110, FGD 114 and PCC 116 are part of a coal fired boiler plant. In some embodiments, the cold exhaust gas from the GTCC plant, e.g., in the range of around 200 degrees F., is sent into the boiler plant. In some embodiments, the range is, e.g., 150 to 250 degrees F. In Stream 1 256, the exhaust gas is sent from outlet of the HRSG 128 directly to the inlet of the forced draft (FD) fan 122 of the coal-fired boiler 104, with a damper 134 to modulate the flow. The GT exhaust 256 will be mixed with fresh air 258 at the inlet to the FD fan 122. The FD fan 122 supplies the combustion air for the entire boiler 104.

In Stream 2 290, the GT exhaust is injected into the outlet of the primary air (PA) fan 124 which provides air for the coal mills 102 and carries the pulverized coal into the furnace through the burners 152. In Stream 3 292, the GT exhaust will be injected into the Cold Air stream 302 coming off the PA fan 124. In Stream 4 294, the GT exhaust is directed to the secondary duct 196 which supplies burner air 310 and over-fire-air 308. In Stream 5 296, GT exhaust is ducted, via duct 212, directly into the bottom of the furnace through water walls below the burners 152.

In some embodiments, each of cold GT exhaust injection streams 2, 3, 4, 5 (290, 292, 294, 296) is arranged individually. In some embodiments, each of cold GT exhaust injection streams 2, 3, 4, 5 (290, 292, 294, 296) are arranged in combination with other streams. In some embodiments, some of cold GT exhaust injection streams 2, 3, 4, 5 (290, 292, 294, 296) are arranged individually, while some of the cold GT exhaust injection streams 2, 3, 4, 5 (290, 292, 294, 296) are arranged in combination with other streams.

In some embodiments, each of these streams (290, 292, 294, 296) is down stream of a booster fan, e.g., booster fan 130, and each stream (290, 292, 294, 296) has a flow modulating damper, e.g. dampers (136, 138, 140, 142), respectively. Any excess amount of exhaust from the GTCC system can be, and in various embodiments, is vented to the atmosphere, e.g., via stack 133.

In the example of system 100 of FIG. 1, there are five gas turbine flue gas inputs (180, 214, 216, 218, 220) which are used to input gas turbine flue gas, e.g., cooled gas turbine flue gas, into the boiler system 103. Gas turbine flue gas input 220 is a gas turbine flue gas boiler hopper input of boiler 104. The gas turbine flue gas hopper input 220 is for receiving gas turbine flue gas 296 and supplying the received gas turbine flue gas 296 into the boiler 104 at a location beneath the burner 152.

Gas turbine flue gas input 216 is a gas turbine flue gas mill air supply duct input which is included as part of mill air supply duct 209 which supplies air to mill 102 which provides fuel 224 to boiler 104.

Gas turbine flue gas input 218 is a gas turbine flue gas burner air supply duct input. Burner air supply duct 196 supplies air to the burner 152 of the boiler 104 and the burner air supply duct 196 includes the gas turbine flue gas burner air supply duct input 218.

Controller 401 controls the supply of gas turbine flue gas to gas turbine flue gas inputs (180, 214, 216, 218, 220) of boiler system 103 based on an oxygen level measured by oxygen sensor 444. Damper 142 is located in gas turbine flue gas duct 212 connected to gas turbine flue gas boiler hopper input 220. In various embodiments, controller 401 is configured to control damper 410 to be in an open position during a first mode of operation during which both the gas turbine 126 and the boiler 104 are active. Fans 122 and 124 blow air 258, e.g., fresh air, which is mixed with gas turbine flue gas, prior to the gas turbine flue gas reaching the boiler 104. In some embodiments, controller 401 is configured to control the throughput of one or both of fans (122 and 124) as a function of the output of the oxygen sensor 444.

In some embodiments, the flue gas input 220 of said boiler hopper supplies more gas turbine flue gas to the boiler system 103 than any other gas turbine flue gas input (180, 214, 216, 218) supplies to the boiler system 103.

In various embodiments, the controller 401 is configured to control dampers (134, 136, 138, 140, 142) to isolate the boiler system 103 from the gas turbine system 109 when the boiler system 103 is active and the gas turbine system 109 is inactive. In some such embodiments, the controller 401 is further configured to isolate the boiler system 103 from the gas turbine system 109 when the boiler system 103 is inactive and the gas turbine system is active.

Figure 2:
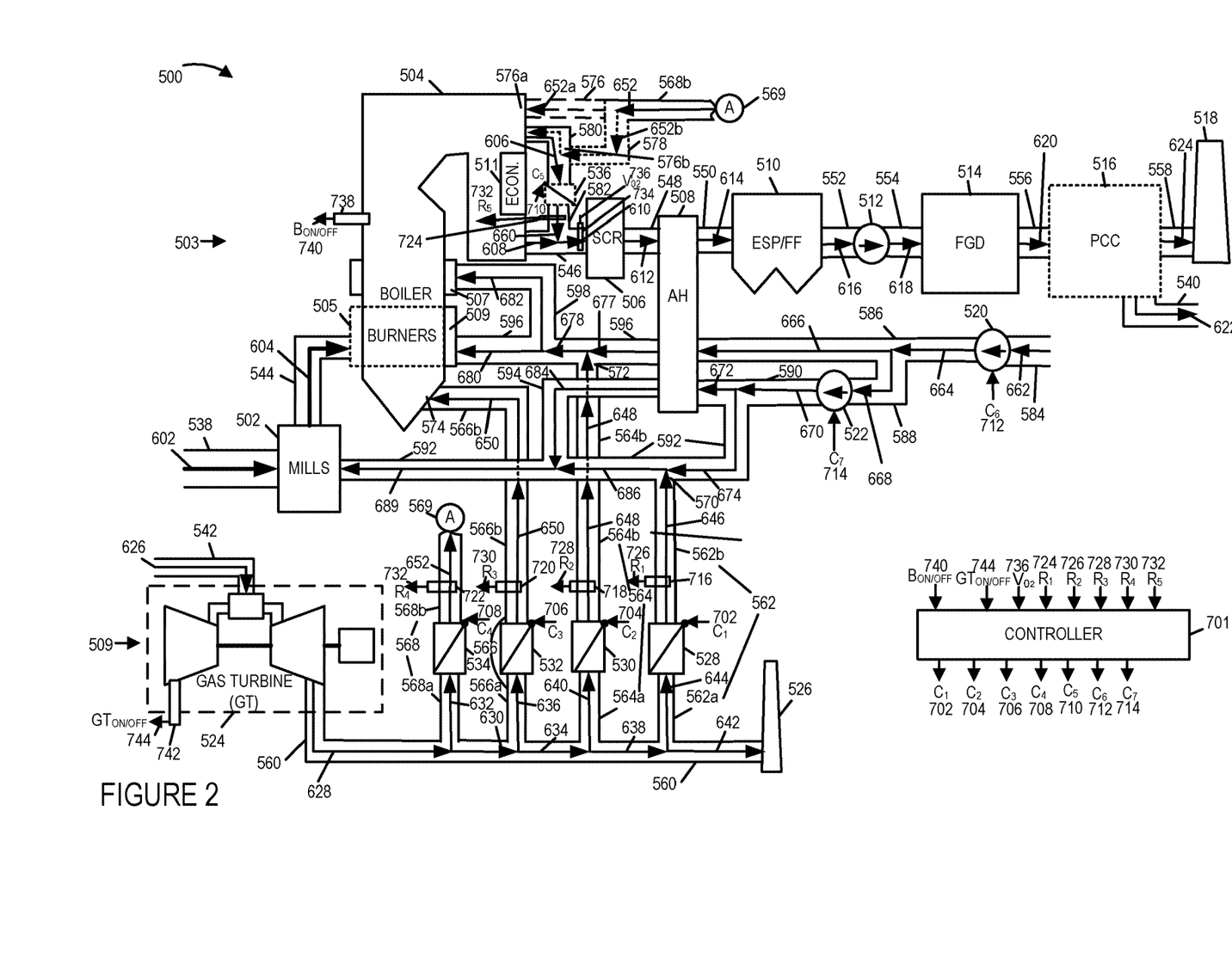
FIG. 2 is a drawing of an exemplary integrated gas turbine-coal fired boiler system, in which hot gas turbine exhaust is injected into boiler related flows in accordance with an exemplary embodiment.

FIG. 2 is a drawing of an exemplary integrated gas turbine-boiler power plant system 500 in accordance with an exemplary embodiment. Exemplary power plant system 500 includes a boiler system 503 including a boiler 504 and a gas turbine system 509 including a gas turbine 524. Exemplary system 500 includes mills 502, a boiler 504, a SCR 506, an air heater (AH) 508, an ESP/FF 510, an ID fan 512, a FGD 514, a PCC 516, a first stack 518, an FD fan 520, a PA fan 522, a gas turbine (GT) 524, a first damper 528, a second damper 530, a third damper 532, a fourth damper 534, a fifth damper 536, a second stack 526, a coal chute 538, a CO2 outlet pipe 540, a natural gas inlet pipe 542, a milled coal feed 544, and a plurality of ducts or pipes (546, 548, 550, 552, 554, 556, 558, 560, 562 including a first portion 562a and a second portion 562b, 564 including a first portion 564a and a second portion 564b, 566 including a first portion 566a and a second portion 566b, 568 including a first portion 568a and a second portion 568b, 578, 580, 582, 584, 586, 588, 590, 592, 594, 596, 598) coupled together as shown in FIG. 2. Note that reference connection A 569 is used to indicate that cutoff portions of duct portion 568b are actually connected.

Exemplary integrated gas turbine-boiler power plant system 500 further includes a controller 701 for controlling operation of system 500, an oxygen sensor 734 for measuring oxygen level in a gas, e.g., flue gas 610 entering SCR 506, a plurality of airflow measurement devices (716, 718, 720, 722, 724), e.g., a plurality of airflow meters, each airflow meter including airflow sensor, or a plurality of airflow sensors for measuring flow rates at selected locations in the system, a boiler on/off sensor 738 configured to indicate boiler operational status, and a gas turbine on/off sensor 742 configured to indicated gas turbine operational status. Controller 701 determines a current mode of operation, processes outputs from various sensors, e.g., activation status sensors (738, 742), flow rate sensors (716, 718, 720, 722, 724), a oxygen measurement sensor 734, determines control, e.g., desired GT flue gas input(s) into the boiler system in terms of which input(s) are to be used at a given time and/or GT flue gas injection amounts for the selected inputs, the desired control position of dampers (528, 530, 532, 534, 536) at a given time to achieve the desired control effects, and the desired throughput of fans (522, 524), and generates and sends control signal(s) to implement the desired control. In various embodiments, GT flue gas input into the boiler system is determined as a function of a measured oxygen level. In various embodiments, controlled throughput of fans (520, 522) is determined as a function of a measured oxygen level and/or the determined mode of operation. Controller 701 receives a boiler active status signal via line 740. Controller 701 receives a gas turbine active status signal via line 744. Controller 701 receives a oxygen sensor measurement signal via line 736. Controller 701 receives airflow rate measurement signals via lines (724, 726, 728, 730, 732). Controller 701 sends controls signals via lines (702, 704, 704, 706, 710 712, 714) to control the position of the dampers and fans.

Exemplary integrated gas turbine-boiler power plant system 500 further includes a controller 701, an oxygen sensor 734, a plurality of airflow measurement devices (716, 718, 720, 722, 724), e.g., a plurality of airflow meters, each airflow meter including airflow sensor, or a plurality of airflow sensors, a boiler on/off sensor 738, and a gas turbine on/off sensor 742.

Coal 602 is fed to mills 502 via coal chute 538. Mills 502 receives the coal 602 and mills the coal 602 generating milled coal 604, e.g., pulverized coal, which is fed, via milled coal feed 544, to the burners 505 of boiler 504. Burner air input stream 680 is received via burner air input 509; over furnace air stream 682 is received via over furnace air input 507. The burners 502 of boiler 504 burn the received milled coal 604 generating steam, e.g., superheated steam, used to drive a steam turbine which spins a generator which generate electrical power. The burner 504 outputs flue gas. A first exhaust gas stream 608, which is a flue gas output, is output from boiler 604 and directed to SCR 506, via duct 546. A second exhaust stream 606, which is an economizer bypass gas stream, is output from the boiler 504 and directed toward the SCR 506 via duct 580 of the economizer bypass provided the damper 536 is open. In some embodiments, duct 578 is included and fourth hot GT exhaust injection stream 652 may be, and sometimes is, directed down duct 578 as gas flow 652*b* and into the economizer duct 580 of the economizer bypass, and toward the boiler 504 upstream of the economizer 511, with the damper 536 in a closed position.

Gas stream 660 is an output stream from damper 536 into duct 582 of the economizer bypass. Gas stream 660 is combined with first exhaust gas boiler output steam 608 to form gas stream 610, which enters SCR 506. In some embodiments, duct 578 and damper 536 are not included, and gas flows 606 and 660 are the same gas flow. Oxygen sensor 734 measures the oxygen level in gas flow stream 610.

The SCR 506 processes the received exhaust gas stream 610, said processing including reducing nitrous oxides (NOx), e.g., into $N_2$ and water, and generates SCR output gas stream 612, which is fed to an inlet of AH 508, via duct 548. Air heater 508 removes heat from the received gas stream 612, at least some of the removed heat is transferred to inlet air streams being directed to the boiler 504 and the mills 502. The outlet gas stream 614 from AH 508 is directed to an inlet of ESP/FF 510 via duct 550. The ESP/FF 510 reduces the amount of ash in the flue gas stream being processed, removing fly ash and other waste products. The outlet gas stream 616 from ESP/FF 510 is directed to the inlet of ID fan 512 via duct 552. The outlet gas stream 618 from ID fan 512 is directed to an inlet of FGD 514. The FGD 514 removes sulfur dioxide (SO2) from the exhaust flue gas being processed. Outlet gas stream 620 from FGD 514 is directed to the inlet of PCC 516 via duct 556. An outlet gas stream 624 from PCC 516 is directed to the inlet of stack 518 via duct 558. PCC 516 also outlets captured CO2 622 via CO2 outlet pipe 540. The captured CO2 can be compressed and stored, e.g., underground, and/or may be utilized for other purposes that do not result in release to the atmosphere. It should be appreciated that some of the captured CO2 includes CO2 which was included in the hot GT exhaust injected gas flows (646, 648, 650, 652).

Gas turbine 524 receives natural gas 626 via gas inlet pipe 542. The gas turbine 524 burns the received natural gas 626 and outputs hot GT exhaust 628, which is hot GT flue gas, via duct 560. Duct 560 is coupled to: an input of stack 526. Duct 560 is also coupled to an inlet of each of: duct 562, duct 564, duct 566, and duct 568. The outputs of duct portions (562*a*, 564*a*, 566*a*, 568*a*) are coupled to the inputs of dampers (528, 530, 532, 534), respectively. The outputs of dampers (528, 530, 532, 534) are coupled to the inputs of duct portions (562*b*, 564*b*, 566*b*, 568*b*), respectively. Hot GT exhaust gas flow 628 is divided into gas flow 630 which proceeds down duct 560 and gas flow 632 which enters duct 568. Gas flow 630 is divided into gas flow 634 which proceeds down duct 560 and gas flow 636 which enters duct 566. Gas flow 634 is divided into gas flow 638 which proceeds down duct 560 and gas flow 640 which enters duct 564. Gas flow 638 is divided into gas flow 642 which proceeds down duct 560 and enters stack 526 and gas flow 644 which enters duct 562.

First hot GT exhaust gas injection stream 646 is output from damper 528 into duct portion 562*b* and is injected into the gas stream 674, via input 570 of duct 592, flowing toward the mills 502, forming combined gas stream 686.

Second hot GT exhaust gas injection stream 648 is output from damper 530 into duct portion 564*b* and is injected into the gas stream 677, via input 572 of duct 596, forming combined gas stream 678, which will supply burner air 680 and OFA air 682.

Third hot GT exhaust gas injection stream 650 is output from damper 532 into duct portion 568*b* and directed into the bottom of the furnace of boiler 504 through water walls below the burners 505, via input 574.

Fourth hot GT exhaust gas injection stream 652 is output from damper 534 into duct portion 568*b* and directed toward the boiler 504. In some embodiments, duct 576 is included and duct 578 is not included and fourth hot GT exhaust injection stream 652 is input to the boiler 504 at input 576*a* above the economizer 511, via duct 576 as gas flow 652*a*. In some embodiments, duct 578 is included and fourth hot GT exhaust injection stream 652 is directed down duct 578, as gas flow 652*b*, and into economizer duct 580 of the economizer bypass at input 576*b*, and gas flow 652*b* is directed toward boiler 504 and gas flow 652*b* is input to the boiler 504 slightly above the economizer 511, with the damper 536 in a closed position.

Fresh air 662, received via duct 584, is directed to the inlet of FD fan 520. The outlet of FD fan 520 is coupled to an inlet of duct 586, and the outlet of duct 586 is coupled to an inlet of AH 508. Duct 588 is also coupled duct 586. Inlet air stream 662 is output from FD fan 520 as air stream 664. A first portion 666 of air stream 664 is directed to an AH 108 inlet via duct 586; a second portion 668 of air stream 664 is directed to an input of PA fan 522 via duct 588. Air heater output air stream 677, which corresponds to air heater input air stream 666, emerges from air heater 508 and is directed via duct 596 toward burner air input 509 of boiler 504.

Duct 596 is coupled, via input 572, to an outlet of duct 564, and duct 596 is also coupled to an inlet of duct 598. Within duct 596 AH output air stream 677 is mixed with received second hot GT exhaust injection stream 648, received from duct 564 via input 572, to generate gas stream 678. A first portion 680 of gas stream 678 is directed to burner input 509 as the burner air stream, via burner air input duct 596; a second portion 682 of gas stream 678 is directed to OFA input 507 via duct 598.

Inlet gas flow with regard to the mills 502 will now be described. PA fan 522 receives air flow 668, via duct 588, and outputs air flow 670 into duct 590. Duct 590 is coupled to duct 592. A first portion 672 of air stream 670 is input to AH 108 via duct 590; and a second portion 674 of air stream 670 is directed into mills inlet duct 592. The outlet of mills inlet duct 592 is coupled to the mills air inlet of mills 502. Mills duct 592 includes inlet 570 which couples duct 562 to duct 592. Air stream 674 is combined in duct 592 with first hot GT exhaust injection stream 646, which is received via input 570 of duct 592 from duct 562, to generate gas stream 686. Duct 592 is further coupled to duct 594. Output air stream 684, which corresponds to inlet air stream 672, emerges from AH 508, and is directed via duct 594 to duct 592. In duct 592, air stream 686 is combined with gas stream 684 to generate mills burner inlet air stream 689.

Third hot GT exhaust stream 650 is directed via duct 566 directly into the bottom of the furnace of boiler 504 through water walls below the burners 505 via input 574.

In some embodiments, the hot GT exhaust gas, which is (900-1150 F) is introduced into the boiler plant, e.g., as injection streams (646, 648, 650, 652) is in the range of 900-1150 degrees F. Due to its high temperature of the hot GT exhaust gas, a booster fan is not used; instead the GT 524 is operated at a significant backpressure, e.g., 20 inches of H2O or higher backpressure, depending on where the GT exhaust is introduced.

Hot GT exhaust steam 1 646 is injected and mixed into the cold air stream for the coal mills 502, e.g., first hot GT exhaust injection stream 646 is mixed with cold air stream 674 to form gas stream 686 which is directed toward the mills 502. Hot GT exhaust stream 2 648 is injected and mixed into the secondary air stream 677 downstream of the air preheater (AH) 508 to form air stream 678 which supplies over-fire-air (OFA) 682 and burner air 680. Hot GT exhaust stream 3 650 is ducted directly into the bottom of the furnace through water walls below the burners 505 via input 574. In some embodiments, hot GT exhaust stream 4 652 is introduced, as gas flow 652a or as gas stream 652b, to the upstream of the economizer 511, a part of the boiler 504 water circuit. In some embodiments, hot GT exhaust gas injection stream 4 652 is injected directly into the main flue gas path upstream of the economizer as gas stream 652a. Alternatively, in some other embodiments, hot GT exhaust gas injection stream 4 652 is injected, as gas flow 652b via duct 578, into a flue gas bypass duct (580,582) connecting the flue gas flow path from economizer inlet to the SCR inlet. The flue gas bypass duct (580, 582) is common for boiler units equipped with SCR. In the second arrangement in which flow 652b is injected into duct 580, a damper 536 is used to prevent the GT exhaust from entering the SCR 506 directly. In the first arrangement in which flow 652a is injected into boiler 504, damper 536 is not included.

Each of hot GT exhaust injection streams (stream 1 646, stream 2 648, stream 3 650, stream 4 652) can be arranged individually or in combination with other streams. Each of these streams (646, 648, 650, 652) has a flow modulating damper (528, 530, 532, 534), respectively. Any excess amount of exhaust from the GTCC system is vented to the atmosphere, e.g., via stack 526.

In the example of system 500 of FIG. 2, there are four gas turbine flue gas inputs (570, 572, 574, 576a or 576b) which are used to input gas turbine flue gas, e.g., hot gas turbine flue gas, into the boiler system 503. Gas turbine flue gas input 574 is a gas turbine flue gas boiler hopper input of boiler 504. The gas turbine flue gas hopper input 574 is for receiving gas turbine flue gas 650 and supplying the received gas turbine flue gas 650 into the boiler 504 at a location beneath the burners 505.

Gas turbine flue gas input 570 is a gas turbine flue gas mill air supply duct input which is included as part of mill air supply duct 592 which supplies air to mill 502 which provides fuel 604 to boiler 504.

Gas turbine flue gas input 572 is a gas turbine flue gas burner air supply duct input. Burner air supply duct 596 supplies air to the burner 505 of the boiler 504 and the burner air supply duct 596 includes the gas turbine flue gas burner air supply duct input 572.

Controller 701 controls the supply of gas turbine flue gas to gas turbine flue gas inputs (570, 572, 574, 576a or 576b) of boiler system 503 based on an oxygen level measured by oxygen sensor 734. Damper 532 is located in gas turbine flue gas duct 566 connected to gas turbine flue gas boiler hopper input 574. In various embodiments, controller 701 is configured to control damper 532 to be in an open position during a first mode of operation during which both the gas turbine 524 and the boiler 504 are active. Fans 520 and 522 blow air 258, e.g., fresh air, which can be, and sometimes is, subsequently mixed with gas turbine flue gas, prior to the mixture including the gas turbine flue gas reaching the boiler 504. In some embodiments, controller 701 is configured to control the throughput of one or both of fans (520 and 522) as a function of the output of the oxygen sensor 734. In some embodiments, controller 701 is configured to control the throughput of one or both of fans (520 and 522) as a function of the determined mode of operation, e.g. with less fresh air being supplied during a first mode of operation in which both the gas turbine and the boiler are active than another mode in which the boiler is active and the gas turbine is inactive.

In some embodiments, the flue gas input 574 of said boiler hopper supplies more gas turbine flue gas to the boiler system 503 than any other gas turbine flue gas input (570, 572, 576a or 576b) supplies to the boiler system 503.

In various embodiments, the controller 701 is configured to control dampers (528, 530, 532, 534) to isolate the boiler system 503 from the gas turbine system 509 when the boiler system 503 is active and the gas turbine system 509 is inactive. In some such embodiments, the controller 701 is further configured to isolate the boiler system 503 from the gas turbine system 509 when the boiler system 503 is inactive and the gas turbine system 509 is active.

Figure 3A:
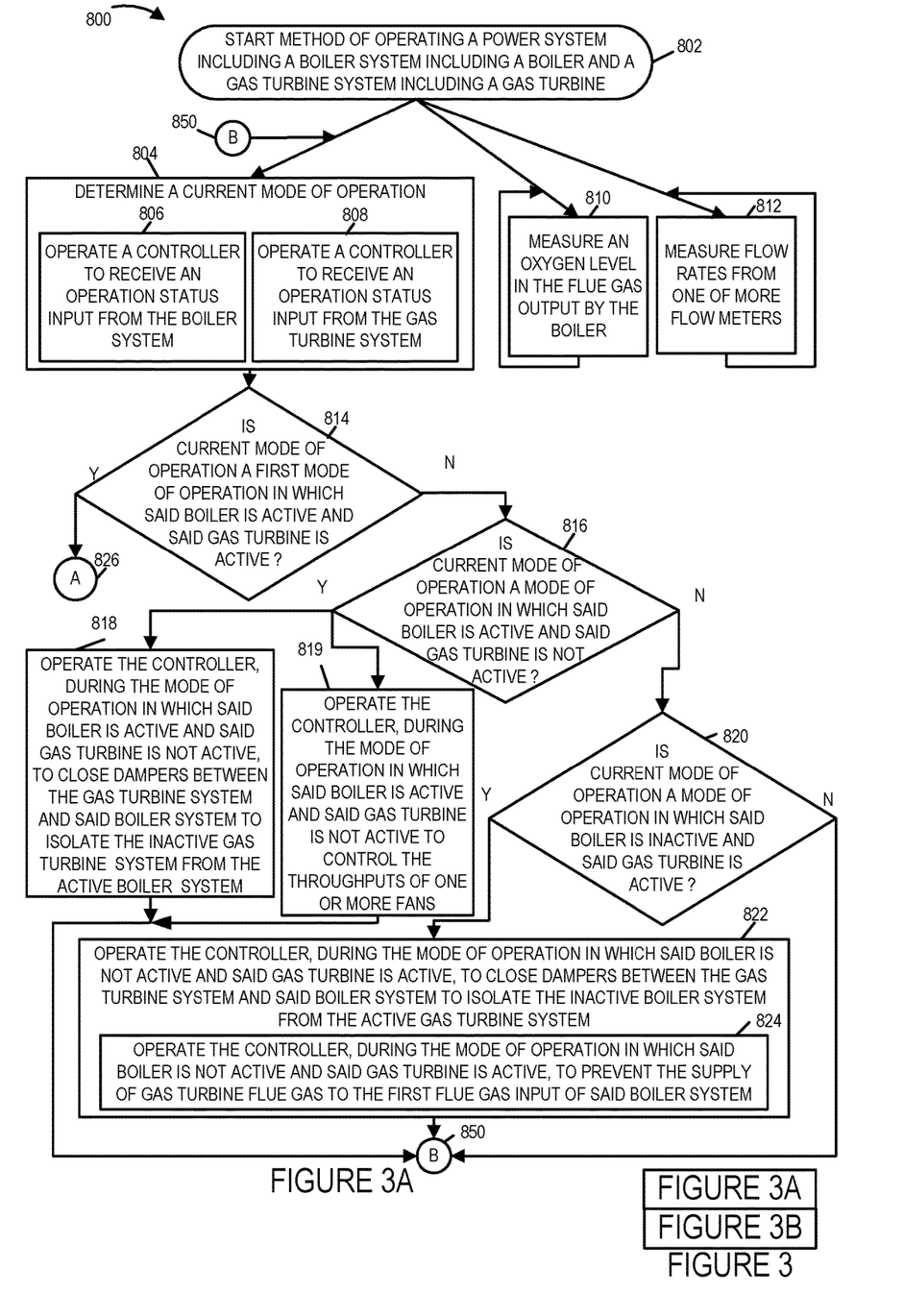
FIG. 3A is a first part of a flowchart of an exemplary method of operating a system including a boiler system and a gas turbine system in accordance with an exemplary embodiment.
Figure 3B:
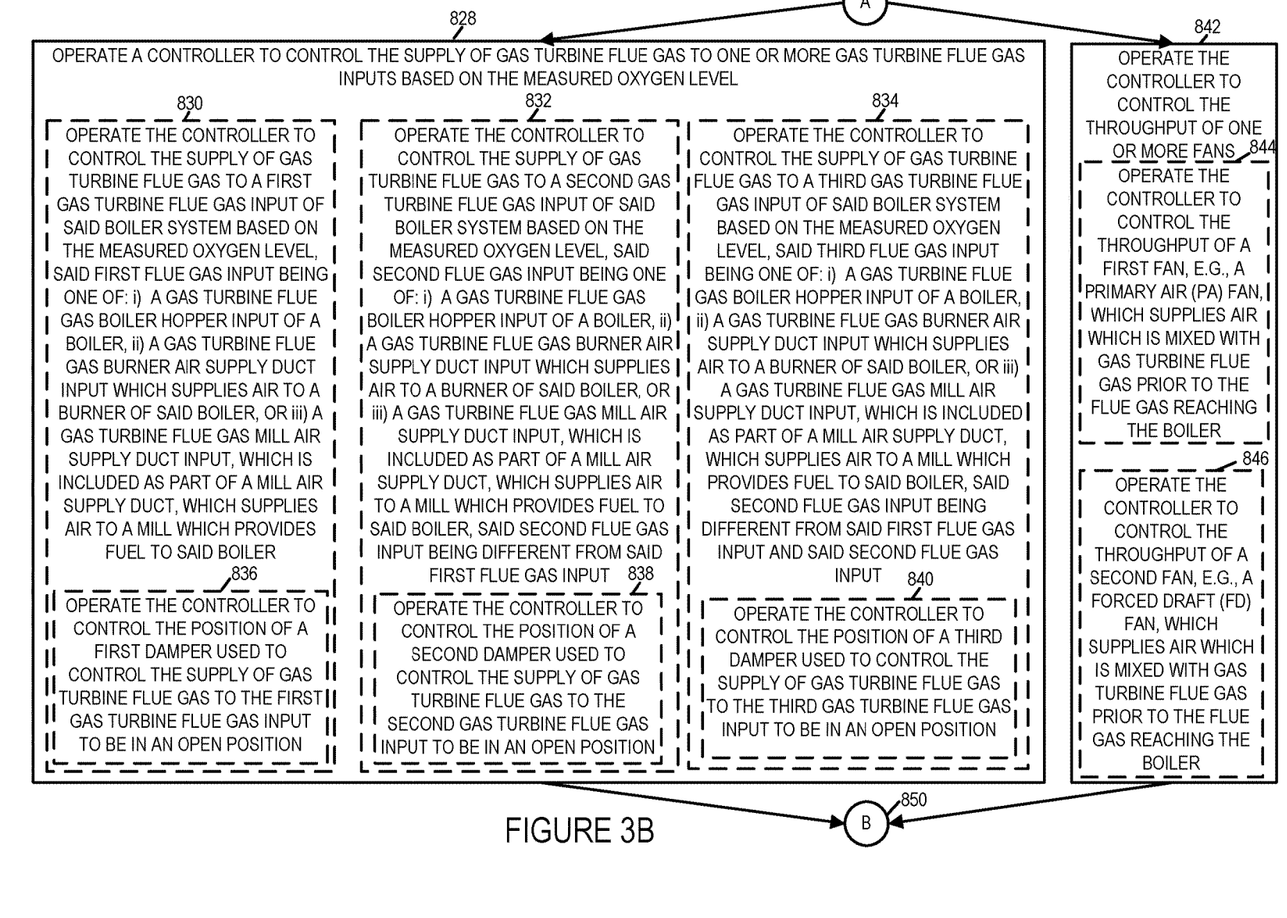
FIG. 3B is a second part of a flowchart of an exemplary method of operating a system including a boiler system and a gas turbine system in accordance with an exemplary embodiment.

FIG. 3, comprising the combination of FIG. 3A and FIG. 3B, is a flowchart 800 of an exemplary method of operating a power system including a boiler system, e.g., a coal fired boiler system, and a gas turbine system, in accordance with an exemplary embodiment. Operation starts in step 802 in which at least a portion of the power system is powered on and initialized. For example, a controller is powered on and initialized and at least one of the boiler system and the gas turbine system is powered on and initialized. Operation proceeds from step 802 to steps 804, 810 and 812, which may be performed in parallel.

In step 804 the controller determines a current mode of operation. Step 804 includes steps 806 and 808. In step 806 the controller is operated to receive an operation status input from the boiler system, e.g., a signal indicating whether the boiler system is active or inactive. In step 808 the controller is operated to receive an operation status input from the gas turbine system, e.g., a signal indicating whether the gas turbine system is active or inactive. In one exemplary embodiment, in step 804, the controller determines whether the current mode of operation is: a first mode of operation in which the boiler is active and the gas turbine is active, a second mode of operation in which said boiler is active and said gas turbine is not active or a third module of operation in which said boiler is inactive and said gas turbine is active. Operation proceeds from step 804 to step 814.

Returning to step 810, in step 810 the oxygen level in the flue gas output by the boiler is measured. In various embodiments the oxygen level is determined based on a signal received from an oxygen sensor which is placed in a boiler flue gas stream flow at a location before the boiler flue gas enters an SCR. In some embodiments, multiple oxygen sensors are placed in the system and used by the controller.

Returning to step 812, in step 812 flow rates are measured from one or more flow meters. In some embodiments, the flow meters include flow rate sensors which are placed in each of the possible gas turbine flue gas input paths from which gas turbine flue gas may be, and sometimes is, injected into the boiler system.

In step 814 if the determination of step 804 is that the current mode of operation is the first mode of operation in which said boiler is active and said gas turbine is active, then operation proceeds from step 814, via connecting node A 826, to steps 828 and 842; otherwise, operation proceeds from step 814 to step 816.

In step 816, if the current mode of operation is a mode of operation in which said boiler is active and said gas turbine is not active, e.g., a second mode of operation, then operation proceeds from step 816 to step 818 and step 819; otherwise, operation proceeds from step 816 to step 820.

In step 818 the controller is operated during the mode of operation in which said boiler is active and said gas turbine is not active to close dampers between the gas turbine system and said boiler system to isolate the inactive gas turbine system from the active boiler system. In step 819 the controller is operated during the mode of operation in which said boiler is active and said gas turbine is not active to control the throughput of one or more fans. Operation proceeds from steps 818 and 819 to connecting node B 850.

In step 820, if the current mode of operation is a mode of operation in which said boiler is inactive and said gas turbine is inactive, e.g., a third mode of operation, then operation proceeds from step 820 to step 822; otherwise, operation proceeds from step 820 to connecting node B 850.

In step 822, the controller is operated, during the mode of operation in which said boiler is not active and said gas turbine is active, to close dampers between the gas turbine system and said boiler system to isolate the inactive boiler system from the active gas turbine system. Step 822 includes step 824 in which the controller, during the mode of operation in which said boiler is not active and said gas turbine is active, to prevent the supply of gas turbine flue gas to first flue gas input of said boiler system. Operation proceeds from step 822 to connecting node B 850. In some embodiments, during the third mode of operation in which the gas turbine is active and the boiler system is inactive, flue gas from the gas turbine system is directed to an additional carbon recovery and/or pollution control system, e.g., a system which is more expensive to operate than the carbon control recovery and pollution control system included in the boiler system.

Returning to step 814, in step 814, if the current mode of operation is a first mode of operation in which said boiler is active and said gas turbine is active, then operation proceeds from step 814, via connecting node A 826 to steps 828 and 842. In step 828 the controller is operated to control the supply of gas turbine flue gas to one or more gas turbine flue gas inputs based on the measured oxygen content level. Step 820 includes one or more or all of steps 830, 832 and 834. In step 830 the controller is operated to control the supply of gas turbine flue gas to a first gas turbine flue gas input of said boiler system based on the measured oxygen content level, said first flue gas input being one of: i) a gas turbine flue gas boiler hopper input of a boiler, ii) a gas turbine flue gas burner air supply duct input which supplies air to a burner of said boiler or iii) a gas turbine flue gas mill air supply duct input, which is included as part of a mill air supply duct, which supplies air to a mill which provides fuel to said boiler. Step 830 includes step 836 in which the controller is operated to control the position of a first damper used to control the supply of gas turbine flue gas to the first gas turbine flue gas input to be in an open position.

In step 832 the controller is operated to control the supply of gas turbine flue gas to a second gas turbine flue gas input of said boiler system based on the measured oxygen content level, said second flue gas input being one of: i) a gas turbine flue gas boiler hopper input of a boiler, ii) a gas turbine flue gas burner air supply duct input which supplies air to a burner of said boiler or iii) a gas turbine flue gas mill air supply duct input, which is included as part of a mill air supply duct, which supplies air to a mill which provides fuel to said boiler, said second flue gas input being different from said first flue gas input. Step 832 includes step 838 in which the controller is operated to control the position of a second damper used to control the supply of gas turbine flue gas to the second gas turbine flue gas input to be in an open position.

In step 834 the controller is operated to control the supply of gas turbine flue gas to a third gas turbine flue gas input of said boiler system based on the measured oxygen content level, said third flue gas input being one of: i) a gas turbine flue gas boiler hopper input of a boiler, ii) a gas turbine flue gas burner air supply duct input which supplies air to a burner of said boiler or iii) a gas turbine flue gas mill air supply duct input, which is included as part of a mill air supply duct, which supplies air to a mill which provides fuel to said boiler, said third flue gas input being different from said first flue gas input and said second flue gas input. Step 838 includes step 840 in which the controller is operated to control the position of a third damper used to control the supply of gas turbine flue gas to the third gas turbine flue gas input to be in an open position.

In step 842 the controller is operated to control the throughput of one or more fans. In various embodiments, the throughput of a fan is controlled by controlling an inlet damper included in an inlet duct prior to the fan inlet, e.g., controlling the position of the damper, and/or by controlling a variable speed drive, e.g., controlling fan motor speed. Step 842 includes one or both of steps 844 and step 846. In step 844 the controller is operated to control the throughput of a first fan, e.g., a primary air (PA) fan, which supplies air which is mixed with turbine flue gas prior to the combined flue including the flue gas reaching the boiler. In step 846 the controller is operated to control the throughput of a second fan, e.g., a forced draft (FD) fan, which supplies air which is mixed with turbine flue gas prior to the combine gas including the flue gas reaching the boiler.

Operation proceeds from steps 828 and 842 to connecting node B 850. Operation proceeds from connecting node B 850 to the input of step 804, in which a current mode of operation is determined. Steps 804, 810 and 812 are repeated on a recurring basis. In various embodiments, the repeat rates for step 804, 810 and 812 are different.

The flowchart 300 of FIG. 3 will now be described for an exemplary embodiment in which the power system is power system 100 of FIG. 1 including a boiler system including boiler 104 and a gas turbine system including gas turbine 126. In step 804 controller 401 determines the current mode of operation based on a received boiler status input signal received on boiler status input signal line $B_{ON/OFF}$ 450 and based on received gas turbine status input signal received gas turbine status input signal line $GT_{ON/OFF}$ 452, which are received by controller 401 in steps (806, 808), respectively from status indicators devices (448, 452), respectively. The determined mode of operation is one of: a first mode is which both the boiler 104 and the gas turbine 126 are active, a second mode in which the boiler 104 is active and the gas turbine 126 is inactive, or a third mode in which the gas turbine 126 is active and the boiler 104 is inactive.

In step 810 the oxygen level in the flue gas output 226 by the boiler 104 is measured based on a sensor measurement signal on oxygen sensor line $V_{O2}$ 446, e.g., a voltage level, from oxygen sensor 444 which is received and processed by controller 401, said processing including comparing the voltage level to a predetermined oxygen sensor model mapping oxygen content level to voltage level.

In step 812 the controller 401 measures flow rates based on received flow rate signals received on flow rate signal lines (R1 432, R2 434, R3 436, R4 438, R5 440, R6 442) from airflow rate measurement devices (420, 422, 424, 426, 428, 430), respectively. In some embodiments, airflow measurement devices (420, 422, 424, 426, 428, 430) are airflow meters with each meter including an airflow rate sensor. In some other embodiments, airflow measurement devices (420, 422, 424, 426, 428, 430) are airflow sensors with the processing of the sensor outputs to determined measured rates being performed within the controller 401.

Operation control steps 814, 816 and 820 are performed by the controller 401 based on the determination of step 804.

In step 818 controller 401 generates and sends control signals via control lines (C1 402, C2 404, C3 406, C4 408, C5 410) to close dampers (134, 136, 138, 140, 142), respectively, to isolate the inactive gas turbine system from the active boiler system.

In step 819 the controller 401 generates and send control signals on control lines (C7 412, C8 414) to fans (FD fan 122, PA fan 124) to control the throughput of the fans. In various embodiments, each fan (122, 124) is initially set at a predetermined fixed level corresponding to the second mode of operation in which the boiler 104 is active and the gas turbine 126 is inactive and therefore no gas turbine flue gas is supplied to the boiler. Subsequently fan throughputs are adjusted, e.g., slightly based on oxygen sensor measurement information. In some such embodiments, the rates of step 819 are higher than the rates of step 842, in which gas turbine flue gas is being input to the boiler.

In step 822 the controller 401 generates and sends control signals via control lines (C1 402, C2 404, C3 406, C4 408, C5 410) to close dampers (134, 136, 138, 140, 142), respectively, to isolate the inactive boiler system from the active gas turbine system.

In step 828 the controller 401 determines desired gas turbine flue gas input injection levels for each of gas turbine flue gas inputs (180, 214, 216, 218, 220), which are inputs the boiler system, based on the measured oxygen level. Controller 401 generates and sends control signal via control lines (C1 402, C2 404, C3 406, C4 408, C5 410) to control the operation of dampers (134, 136, 138, 140, 142), respectively. The control of step 828 includes controlling one or more dampers (134, 136, 138, 140, 142) to be in an open position, which allows gas turbine flue gas to be input into the boiler system. In some embodiments, a damper is controlled to be either in a fully closed or fully open position. In some embodiments, a damper may be, and sometimes is controlled to be in a fully closed position, a fully open position, or a partially open position. In some such embodiments, control supports a fixed number of predetermined partially open conditions for a damper, e.g., 8 or less different partially open conditions. In some embodiments, control supports a continuous range of partially open conditions for a damper.

Consider that the first gas turbine flue gas input is gas turbine flue gas hopper input 220 of boiler 104. In step 830, including step 836, controller 401 generates and sends a control signal on control signal line C5 410 to control the position of damper 142 to be in an open position, which results in flue gas 296 being input to flue gas hopper input 220 of boiler 104.

Further consider that the second gas turbine flue gas input is the gas turbine flue gas burner air supply duct input 218 which supplies air to the burners 152 of said boiler 104. In step 832, including step 838, controller 401 generates and sends a control signal on control signal line C4 408 to control the position of damper 140 to be in an open position, which results in flue gas 294 being input into gas turbine flue gas burner air supply duct input 218 of duct 196.

Further consider that the third gas turbine flue gas input is the gas turbine flue gas mill air duct supply duct input 216, which is included as part of a mill air duct 209 which supplies air to mill 102 which provides fuel 224 said boiler 104. In step 834, including step 840, controller 401 generates and sends a control signal on control signal line C3 406 to control the position of damper 138 to be in an open position, which results in flue gas 292 being input into the gas turbine flue gas mill air duct supply duct input 216 of a mill air duct 209.

In some embodiments, controller 401 generates and sends a control signal via control signal line C2 404 to control the position of damper 136 to be in an open position, which results in gas turbine flue gas 290 being input into gas turbine flue gas input 214 of duct 190.

In some embodiments, controller 401 generates and sends a control signal via control signal line C1 402 to control the position of damper 134 to be in an open position, which results in gas turbine flue gas 256 being input into gas turbine flue gas input 180 of duct 182.

In step 842, including steps 844 and 846, controller 401 determines desired throughputs for FD fan 122 and PA fan 124, generates and sends control signals on control lines (C7 412, C8 414), respectively to control the throughputs of the fans (122, 124), respectively, which supply air 258 which is mixed with gas turbine flue gas prior to the mixture including the flue gas reaching the boiler 104. In various embodiments, the fan throughputs of step 842 are adjusted, e.g., lowered, with respect to gas turbine inactive mode of operation of step 819, since with the gas turbine active some or all of the fresh supply air 258 can be, and sometimes is, replaced by gas turbine flue gas.

The flowchart 300 of FIG. 3 will now be described for an exemplary embodiment in which the power system is power system 500 of FIG. 2 including a boiler system including boiler 504 and a gas turbine system 509 including gas turbine 524. In step 804 controller 701 determines the current mode of operation based on a received boiler status input signal received on boiler status input signal line $B_{ON/OFF}$ 740 and based on received gas turbine status input signal received gas turbine status input signal line $GT_{ON/OFF}$ 744, which are received by controller 701 in steps (806, 808), respectively from status indicators devices (738, 742), respectively. The determined mode of operation is one of: a first mode is which both the boiler 504 and the gas turbine 524 are active, a second mode in which the boiler 504 is active and the gas turbine 524 is inactive, or a third mode in which the gas turbine 524 is active and the boiler 504 is inactive.

In step 810 the oxygen level in the flue gas output 610 by the boiler 504, prior to the SCR 506, is measured based on a sensor measurement signal on oxygen sensor line $V_{O2}$ 736, e.g., a voltage level, from oxygen sensor 734 which is received and processed by controller 701, said processing including comparing the voltage level to a predetermined oxygen sensor model mapping oxygen content level to voltage level.

In step 812 the controller 701 measures flow rates based on received flow rate signals received on flow rate signal lines (R1 724, R2 726, R3 728, R4 730, R5 732) from airflow rate measurement devices (716, 718, 720, 722, 724), respectively. In some embodiments, airflow measurement devices (716, 718, 720, 722, 724) are airflow meters with each meter including an airflow rate sensor. In some other embodiments, airflow measurement devices (716, 718, 720, 722, 724) are airflow sensors with the processing of the sensor outputs to determine measured rates being performed within the controller 701. In some embodiments, the airflow rate sensors' measurement signals are input to different channels of a meter included within controller 701, e.g., with multiplexing occurring between the channels.

Operation control steps 814, 816 and 820 are performed by the controller 701 based on the determination of step 804.

In step 818 controller 701 generates and sends control signals via control lines (C1 702, C2 704, C3 706, C4 708) to close dampers (528, 530, 532, 534), respectively, to isolate the inactive gas turbine system from the active boiler system.

In step 819 the controller 701 generates and send control signals on control lines (C6 712, C7 714) to fans (FD fan 520, PA fan 522) to control the throughput of the fans. In various embodiments, each fan (520, 524) is initially set at a predetermined fixed level corresponding to the second mode of operation in which the boiler 504 is active and the gas turbine 524 in inactive and since the gas turbine 524 is inactive no gas turbine flue gas is supplied to the boiler in the second mode of operation. In some such embodiments, the fan throughput rates are adjusted slightly, e.g., a change of 25% or less, from the initial nominal rates based on an oxygen sensor measurement. In some embodiments, the rates of step 819 are higher than the rates of step 842, in which gas turbine flue gas is being input to the boiler.

In step 822 the controller 701 generates and sends control signals via control lines (C1 702, C2 704, C3 706, C4 708) to close dampers (528, 530, 532, 534), respectively, to isolate the inactive boiler system from the active gas turbine system.

In step 828 the controller 701 determines desired gas turbine flue gas input injection levels for each of gas turbine flue gas inputs (570, 572, 574, 652*a* or 652*b*), which are inputs the boiler system, based on the measured oxygen level. Controller 701 generates and sends control signal via control lines (C1 702, C2 704, C3 706, C4 708) to control the operation of dampers (528, 530, 532, 534), respectively. The control of step 828 includes controlling one or more dampers (528, 530, 532, 534) to be in an open position, which allows gas turbine flue gas to be input into the boiler system. In some embodiments, a damper is controlled to be either in a fully closed or fully open position. In some embodiments, a damper may be, and sometimes is controlled to be in a fully closed position, a fully open position, or a partially open position. In some such embodiments, control supports a fixed number of predetermined partially open conditions for a damper, e.g., 16 or less different partially open conditions. In some embodiments, control supports a continuous range of partially open conditions for a damper.

Consider that the first gas turbine flue gas input is gas turbine flue gas hopper input 574 of boiler 504. In step 830, including step 836, controller 701 generates and sends a control signal on control signal line C3 706 to control the position of damper 532 to be in an open position, which results in flue gas 650 being input to flue gas hopper input 574 of boiler 504.

Further consider that the second gas turbine flue gas input is the gas turbine flue gas burner air supply duct input 572 which supplies air to a burner of said boiler 504. In step 832, including step 838, controller 701 generates and sends a control signal on control signal line C2 704 to control the position of damper 530 to be in an open position, which results in flue gas 648 being input into gas turbine flue gas burner air supply duct input 572 of duct 596.

Further consider that the third gas turbine flue gas input is the gas turbine flue gas mill air duct supply duct input 570, which is included as part of a mill air duct 592 which supplies air to mill 502 which provides fuel 604 said boiler 504. In step 834, including step 840, controller 701 generates and sends a control signal on control signal line C1 702 to control the position of damper 528 to be in an open position, which results in flue gas 646 being input into the gas turbine flue gas mill air duct supply duct input 570 of the mill air duct 592.

In some embodiments, controller 701 generates and sends a control signal via control signal line C4 708 to control the position of damper 534 to be in an open position, which results in gas turbine flue gas 652 being input into gas turbine flue gas input 576*a* of boiler 504 as flue gas 652*a* or which results in gas turbine flue gas 652 being input into gas turbine flue gas input 576*b* of duct 580 as flue gas 652*b*, depending upon the particular embodiment of the boiler system.

In some embodiments, controller 701 generates and sends a control signal via control signal line C5 710 to control the position of damper 536 to be in an closed position, which results in gas turbine flue gas 652*b* entering economizer bypass duct 580 at input 576*b* and being directed toward boiler 504 where it enters the boiler 504 upstream of the economizer 511.

In step 842, including steps 844 and 846, controller 701 determines desired throughputs for FD fan 520 and PA fan 522, generates and sends control signals on control lines (C6 712, C7 714), respectively to control the throughputs of the fans (520, 522), respectively, which supply air 662, e.g., fresh air, which is mixed with gas turbine flue gas prior to the mixed gas including the fresh air and the flue gas reaching the boiler. In various embodiments, the fan throughputs of step 842 are adjusted, e.g., lowered, with respect to gas turbine inactive mode of operation of step 819, since with the gas turbine active some or all of the air 662 can be, and sometimes is replaced by gas turbine flue gas, i.e., not as much fresh air 662 is needed to be supplied to the burner system since some or all of the fresh air is replaced by flue gas from the gas turbine system.

Various additional features of the present invention will now be described in connection with exemplary apparatus/ system embodiments. The apparatus/system embodiments are only exemplary in nature and the features may be used in any number of combinations.

A power system (100 or 500) embodiment 1 includes: a boiler system (103 or 503) including: a boiler (104 or 504); an oxygen sensor (444 or 734); and one or more gas turbine flue gas inputs ((180, 214, 216, 218, 220) or (570, 572, 574, 576*a* or 576*b*))) including at least one of: i) a gas turbine flue gas boiler hopper input (220 or 574) of said boiler (104 or 504) or ii) a gas turbine flue gas mill air supply duct input (216 or 570) which is included as part of a mill air supply duct (209 or 592) which supplies air to a mill (102 or 502) which provides fuel (224 or 604) to said boiler (104 or 504); a gas turbine system (109 or 509); and a controller (401 or 701) for controlling the supply of gas turbine flue gas to said one or more gas turbine flue gas inputs ((180,214, 216, 218, 220) or (570, 572, 574, 576*a* or 576*b*)) of said boiler system (103 or 503) based on an oxygen level measured by said oxygen sensor (444 or 734).

A power system embodiment 2 including the power system embodiment 1, wherein the boiler system (103 or 503) includes: a burner (152 or 505); and at least said gas turbine flue gas boiler hopper input (220 or 574) for receiving gas turbine flue gas (296) and supplying said received gas turbine flue gas (296) into said boiler (104 or 504) at a location beneath the burner (152 or 505).

A power system embodiment 3 including the power system embodiment 2, wherein said boiler system (103 or 503) further includes: a burner air supply duct (196 or 596) which supplies air to a burner (152 or 505) of said boiler (104 or 504), said burner air supply duct (196 or 596) including a gas turbine flue gas burner air supply duct input (218 or 572).

A power system embodiment 4 including the power system embodiment 2, wherein said boiler system (103 or 503) includes both the gas turbine flue gas boiler hopper input (220 or 574) of said boiler and the gas turbine flue gas mill air supply duct input (216 or 570).

A power system embodiment 5 including the power system embodiment 2 wherein the power system embodiment 2 further includes: a first damper (142 or 532) in a first gas turbine flue gas duct (212 or 566) connected to said gas turbine flue gas boiler hopper input (220 or 574); and wherein said controller (401 or 701) is configured to control the first damper (142 or 532) to be in an open position during a first mode of operation during which both said gas turbine (126 or 524) and said boiler (104 or 504) are active.

A power system embodiment 6 including the power system embodiment 5 wherein the power system embodiment 5 further includes: a fan ((122 or 124) or (520 or 522)) which blows air (258 or 584) which is mixed with gas turbine flue gas prior to the gas turbine flue gas reaching the boiler (104 or 504); and wherein said controller (401 or 701) is further configured to control the throughput of the fan (PA fan (124 or 522) or FD fan (122 or 520)) as a function of the output of said oxygen sensor (444 or 734).

A power system embodiment 7 including the power system embodiment 5, wherein said flue gas input of said boiler hopper (220 or 574) supplies more gas turbine flue gas to said boiler system (103 or 503) than any other gas turbine flue gas input ((180, 214, 216, 218) or (570, 572, 576a or 576b)) supplies to said boiler system (103 or 503).

A power system embodiment 8 including the power system embodiment 2, wherein said controller (401 or 701) is further configured to control dampers ((134, 136, 138, 140, 142) or (528, 530, 532, 534)) to isolate said boiler system (103 or 503) from said gas turbine system (109 or 509) when said boiler system (103 or 503) is active and said gas turbine system (109 or 509) is inactive.

A power system embodiment 9 including the power system embodiment 8, wherein said controller (401 or 701) is further configured to control said dampers ((134, 136, 138, 140, 142) or (528, 530, 532, 534)) to isolate said boiler system (103 or 503) from said gas turbine system (109 or 509) when said boiler system (103 or 503) is inactive and said gas turbine system (109 or 509) is active.

Various additional features of the present invention will now be described in connection with exemplary method embodiments. The method embodiments are only exemplary in nature and the features may be used in any number of combinations.

A method embodiment 1 of operating a system (100 or 500) including a boiler system (103 or 503) and a gas turbine system (109 or 509), the boiler system (103 or 503) including a boiler (104 or 504), the gas turbine system (109 or 509) including a gas turbine (524), the method including: measuring an oxygen level in flue gas output by the boiler (104 or 504); operating a controller (401 or 701), during a first mode of operation during which said boiler (504) is active and said gas turbine (524) is active, to control the supply of gas turbine flue gas to a first gas turbine flue gas input of said boiler system based on the measured oxygen level, said first flue gas input being one of: i) a gas turbine flue gas boiler hopper input (220 or 574) of a boiler (104 or 504), ii) a gas turbine flue gas burner air supply duct input (210 or 572) which supplies air to a burner (152 or 505) of said boiler (104 or 504), or iii) a gas turbine flue gas mill air supply duct input (216 or 570) which is included as part of a mill air supply duct (209 or 592) which supplies air to a mill (102 or 502) which provides fuel (224) to said boiler (104 or 504).

A method embodiment 2 including the method of method embodiment 1, wherein operating the controller (401 or 701), during the first mode of operation includes operating the controller (401 or 701) to control a position of a first damper used to control the supply of gas turbine flue gas to the first gas turbine flue gas input to be in an open position.

A method embodiment 3 including the method of method embodiment 2, the method of method embodiment 3 further including: operating the controller to control the throughput of a fan (PA fan or FD fan) which supplies air which is mixed with gas turbine flue gas prior to the gas turbine flue gas reaching the boiler.

A method embodiment 4 including the method of method embodiment 2, wherein said controller further controls during the first mode of operation a supply of gas turbine flue gas to a second gas turbine flue gas input of said boiler system based on the measured oxygen level, the second flue gas input being one of: i) a boiler hopper input of a boiler, ii) a burner air supply duct which supplies air to a burner of said boiler, or iii) a mill air supply duct which supplies air to a mill which provides fuel to said boiler, said second flue gas input being different from said first flue gas input.

A method embodiment 5 including the method of method embodiment 4, wherein said first flue gas input is said gas turbine flue gas boiler hopper input and said second flue gas input is one of the gas turbine flue gas burner air supply duct input or the gas turbine flue gas mill air supply duct input.

A method embodiment 6 including the method of method embodiment 5, wherein said controller further controls during the first mode of operation a supply of gas turbine flue gas to a third gas turbine flue gas input of said boiler system based on the measured oxygen level, the third flue gas input being the gas turbine flue gas mill air supply duct input, said second flue gas input being different from said first flue gas input.

A method embodiment 7 including the method of method embodiment 1, the method of method embodiment 7 further including: operating the controller, during a second mode of operation during which said boiler is not active and said gas turbine is active, to prevent the supply of gas turbine flue gas to the first flue gas input of said boiler system.

A method embodiment 8 including the method of method embodiment 1, the method of method embodiment 8 further including: operating the controller, during a second mode of operation during which said boiler is active and said gas turbine is not active to close dampers between the gas turbine system and said boiler system to isolate the inactive gas turbine system from the active boiler system.

A method embodiment 9 including the method of method embodiment 8, the method of method embodiment 9 further including: operating the controller, during a third mode of operation during which said boiler is not active and said gas turbine is active to close said dampers between the gas turbine system and said boiler system to isolate the inactive boiler system from the active gas turbine system.

Numerous additional variations on the methods and apparatus of the present invention described above will be apparent to those skilled in the art in view of the above description of the invention. Such variations are to be considered within the scope of the invention.

What is claimed is:

1. A method of operating a system including a boiler system and a gas turbine system, the boiler system including a boiler, the gas turbine system including a gas turbine, the method comprising:
   measuring an oxygen level in flue gas output by the boiler;
   operating a controller, during a first mode of operation during which said boiler is active and said gas turbine is active, to control the supply of gas turbine flue gas to a first gas turbine flue gas input of said boiler system based on the measured oxygen level, said first flue gas input being one of: i) a gas turbine flue gas boiler hopper input of a boiler, ii) a gas turbine flue gas burner air supply duct input which supplies air to a burner of said boiler, or iii) a gas turbine flue gas mill air supply duct input which is included as part of a mill air supply duct which supplies air to a mill which provides fuel to said boiler, said step of operating the controller, during the first mode of operation, including operating the controller to control a position of a first damper used to control the supply of gas turbine flue gas to the first gas turbine flue gas input to be in an open position;
   operating the controller to control the throughput of a fan which supplies air which is mixed with gas turbine flue gas prior to the gas turbine flue gas reaching the boiler; and
   wherein said controller further controls, during the first mode of operation, a supply of gas turbine flue gas to a second gas turbine flue gas input of said boiler system based on the measured oxygen level, the second flue gas input being one of: a boiler hopper input of a boiler, ii) a burner air supply duct which supplies air to a burner of said boiler, or iii) a mill air supply duct which supplies air to a mill which provides fuel to said boiler, said second flue gas input being different from said first flue gas input.

2. The method of claim 1, wherein said first flue gas input is said gas turbine flue gas boiler hopper input and said second flue gas input is one of the gas turbine flue gas burner air supply duct input or the gas turbine flue gas mill air supply duct input.

3. The method of claim 2, wherein said controller further controls, during the first mode of operation, a supply of gas turbine flue gas to a third gas turbine flue gas input of said boiler system based on the measured oxygen level, the third flue gas input being the gas turbine flue gas mill air supply duct input, said second flue gas input being different from said first flue gas input.

4. The method of claim 1, further comprising:
   operating the controller, during a second mode of operation during which said boiler is not active and said gas turbine is active, to prevent the supply of gas turbine flue gas to the first flue gas input of said boiler system.

5. A method of operating a system including a boiler system and a gas turbine system, the boiler system including a boiler, the gas turbine system including a gas turbine, the method comprising:
   measuring an oxygen level in flue gas output by the boiler;
   operating a controller, during a first mode of operation during which said boiler is active and said gas turbine is active, to control the supply of gas turbine flue gas to a first gas turbine flue gas input of said boiler system based on the measured oxygen level, said first flue gas input being one of: i) a gas turbine flue gas boiler hopper input of a boiler, ii) a gas turbine flue gas burner air supply duct input which supplies air to a burner of said boiler, or iii) a gas turbine flue gas mill air supply duct input which is included as part of a mill air supply duct which supplies air to a mill which provides fuel to said boiler; and
   operating the controller, during a second mode of operation during which said boiler is active and said gas turbine is not active to close dampers between the gas turbine system and said boiler system to isolate the inactive gas turbine system from the active boiler system.

6. The method of claim 5 further comprising:
   operating the controller, during a third mode of operation during which said boiler is not active and said gas turbine is active to close said dampers between the gas turbine system and said boiler system to isolate the inactive boiler system from the active gas turbine system.

* * * * *